US008620483B2

(12) United States Patent
Takeshita et al.

(10) Patent No.: US 8,620,483 B2
(45) Date of Patent: Dec. 31, 2013

(54) CONTROL METHOD AND CONTROL DEVICE OF STEAM SYSTEM

(75) Inventors: Kazuko Takeshita, Hiroshima (JP); Susumu Kouno, Hiroshima (JP); Haruaki Hirayama, Hiroshima (JP); Naohiko Ishibashi, Hiroshima (JP); Yosuke Nakagawa, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 945 days.

(21) Appl. No.: 12/376,375

(22) PCT Filed: Feb. 14, 2008

(86) PCT No.: PCT/JP2008/052458

§ 371 (c)(1), (2), (4) Date: Mar. 12, 2010

(87) PCT Pub. No.: WO2008/102691

PCT Pub. Date: Aug. 28, 2008

(65) Prior Publication Data

US 2010/0161136 A1 Jun. 24, 2010

(30) Foreign Application Priority Data

Feb. 20, 2007 (JP) ................................ 2007-039671

(51) Int. Cl.

| | |
|---|---|
| ***F01B 31/06*** | (2006.01) |
| ***F01K 7/24*** | (2006.01) |
| ***F01K 7/40*** | (2006.01) |
| ***F01K 9/00*** | (2006.01) |
| ***F01K 13/02*** | (2006.01) |
| ***F02C 1/00*** | (2006.01) |
| ***F02G 1/00*** | (2006.01) |
| ***G05D 3/00*** | (2006.01) |

(52) U.S. Cl.

USPC ................. 700/289; 60/646; 60/657; 60/661; 60/666

(58) Field of Classification Search

USPC ............... 700/287, 289; 60/39.182, 646, 657, 60/658, 660, 661, 666, 667, 772

See application file for complete search history.

(56) References Cited

U.S. PATENT DOCUMENTS

| | | | |
|---|---|---|---|
| 3,894,394 | A | 7/1975 | Braytenbah et al. |
| 3,990,244 | A | 11/1976 | Kruger et al. |

(Continued)

FOREIGN PATENT DOCUMENTS

| | | |
|---|---|---|
| JP | 50-127003 A | 10/1975 |
| JP | 56-159601 U | 11/1981 |

(Continued)

OTHER PUBLICATIONS

Written Opinion of International Searching Authority dated Feb. 14, 2008, for International application No. PCT/JP2008/052457.

(Continued)

*Primary Examiner* — Mohammad Ali
*Assistant Examiner* — Jennifer L Norton
(74) *Attorney, Agent, or Firm* — Westerman, Hattori, Daniels & Adrian, LLP

(57) ABSTRACT

A steam system control method applied to a steam system including: a low-pressure header storing low-pressure steam; a high-pressure header storing high-pressure header; a steam turbine connected between them; and a turbine bypass line introducing controlled amount of steam from the high-pressure header to the low-pressure header by bypassing the steam turbine. The low-pressure header has a blow-off valve for discharging excessive steam to the outside. The steam system control method includes: a normal time blow-off valve control step of PI controlling the opening of the blow-off valve; and a trip time blow-off control step of controlling the opening of the blow-off valve by changing the MV value to a predetermined trip time opening set value when the turbine is tripped. According to this method, the opening of the blow-off valve is controlled based on the predetermined MV value when the turbine trips and excessive steam flows into the bypass, so that excessive steam flows into the low-pressure header is quickly discharged to the outside. Stable operation can be achieved even when a turbine trips.

10 Claims, 5 Drawing Sheets

(56) References Cited

U.S. PATENT DOCUMENTS

| | | | | | |
|---|---|---|---|---|---|
| 4,007,595 | A | * | 2/1977 | Braytenbah et al. | 376/211 |
| 4,007,596 | A | | 2/1977 | Braytenbah et al. | |
| 4,330,367 | A | * | 5/1982 | Musick | 376/245 |
| 4,455,614 | A | | 6/1984 | Martz et al. | |
| 4,679,399 | A | | 7/1987 | Strickler | |
| 4,752,697 | A | * | 6/1988 | Lyons et al. | 290/2 |
| 4,975,238 | A | * | 12/1990 | Regan et al. | 376/216 |
| 5,133,189 | A | * | 7/1992 | Hurley | 60/646 |
| 7,997,084 | B2 | * | 8/2011 | Kamohara et al. | 60/782 |
| 2005/0198939 | A1 | | 9/2005 | Hattori et al. | |
| 2006/0101824 | A1 | * | 5/2006 | Takeda et al. | 60/727 |

FOREIGN PATENT DOCUMENTS

| | | | |
|---|---|---|---|
| JP | 58-5415 | A | 1/1983 |
| JP | 63-071505 | A | 3/1988 |
| JP | 63-243406 | A | 10/1988 |
| JP | 7-229405 | A | 8/1995 |
| JP | 11-257018 | A | 9/1999 |

OTHER PUBLICATIONS

European Search Report dated Mar. 8, 2010, issued in corresponding European Patent Application No. 08711297.

Notice of Allowance dated Oct. 24, 2013, issued in related U.S. Appl. No. 12/375,780.

European Search Report dated Mar. 8, 2010, issued in related European Patent Application No. 08711296.7.

Weiss et al., "Weiterentwicklung der Regel-und Sicherheitssysteme für Dampfturbinen", VGB Kraftwerkstechnik 73 (Apr. 1, 1993), Heft 4, pp. 345-351 (European Search Report dated Mar. 8, 2010).

International Search Report of PCT/JP2008/052458, date of mailing May 13, 2008.

* cited by examiner

CONTROL METHOD AND CONTROL DEVICE OF STEAM SYSTEM

TECHNICAL FIELD

The present invention relates to a pressure control of a steam system in chemical plants. This application is based on Japanese Patent Application No. 2007-039671 filed on Feb. 20, 2007. Disclosure of the Japanese Patent Application is incorporated hereby by reference.

BACKGROUND ART

In chemical plants such as a methanol plant or an ammonia plant (including urea plant), high-temperature and high-pressure steam is used. FIG. 1 shows an example of the configuration of a steam system for controlling the steam.

The steam system 2 has a high-pressure header 4 which stores high-pressure steam therein and a low-pressure header 6 which stores low-pressure steam whose pressure is lower than that of the high-pressure steam. In some plants, a header corresponding to the low-pressure header 6 in FIG. 1 may be referred to as a medium-pressure side header.

The high-pressure header 4 is connected to a waste-heat boiler 8. The waste-heat boiler 8 supplies high-pressure steam to the high-pressure header 4. A supply system of the waste-heat boiler 8 has a safety valve 10 and a blow-off valve 12. When a steam pressure of the supply system exceeds a first predetermined pressure, a controller of the blow-off valve 12 gradually increases valve opening set to be full opened in normal time to release steam to the outside of the system. When the pressure of the supply system exceeds a second predetermined pressure set larger than the first predetermined pressure, the safety valve 10 is opened depending on the steam pressure to release steam to the outside of the system. The high-pressure header 4 is further connected to an auxiliary boiler system 14. The auxiliary boiler system 14 supplies high-pressure steam generated by an auxiliary boiler (package boiler) to the high-pressure header 4.

The low-pressure header 6 has a blow-off valve 30. When the steam pressure in the low-pressure header 6 exceeds a predetermined blow-off valve control start pressure, a controller 32 of the blow-off valve 30 gradually increases the valve opening set to be full opened in normal time to release steam to the outside of the system. This control is performed by means of a PI controller using a difference between a measurement value PV (Process Value) of the steam pressure in the low-pressure header 6 and a blow-off valve MV (Manipulated Value) set to be slightly larger than a target value of the steam pressure in the low-pressure header in normal time.

The low-pressure header 6 further has a safety valve 28. When the steam pressure exceeds a safety valve control start pressure set to be larger than the blow-off valve control start pressure, the safety valve 28 is opened depending on the steam pressure to release steam to the outside of the system. The low-pressure header 6 further supplies low-pressure steam to a low-pressure side system 34.

The high-pressure header 4 is connected to a turbine 16. High-pressure steam of the high-pressure header 4 is introduced into the turbine 16 through a turbine inlet piping 18. The turbine 16 is driven by the high-pressure steam, supplies mechanical energy to external apparatuses not shown and discharges steam with a lower pressure. Apart of the discharged steam is supplied to the low-pressure header 6 through a turbine outlet piping 20. Another part of the steam is supplied to a condenser not shown and the like.

The steam system 2 further has a turbine bypass line 22 connecting the high-pressure header 4 to the low-pressure header 6. The turbine bypass line 22 has the turbine bypass valve 23 for controlling a flow of steam flowing therein. When the turbine bypass valve 23 is opened, high-pressure steam of the high-pressure header 4 is supplied to the low-pressure header 6 through the turbine bypass line 22.

The turbine bypass valve 23 is controlled by operating a solenoid according to a control signal sent from a control part 24. The control part 24 has a high-pressure side controller 25, a low-pressure side controller 27 and a higher-order selector 26.

The high-pressure side controller 25 receives an input of a high-pressure side pressure being a value obtained by measuring pressure in the high-pressure steam of the high-pressure header 4. Based on a pre-stored process, the high-pressure side controller 25 generates high-pressure side MV for instructing opening of the turbine bypass valve 23 from the input high-pressure side pressure and outputs the high-pressure side MV.

The low-pressure side controller 25 receives an input of a low-pressure side pressure being a value obtained by measuring pressure in the low-pressure steam of the low-pressure header 6. Based on a pre-stored process, the low-pressure side controller 25 generates low-pressure side MV for instructing opening of the turbine bypass valve 23 from the input low-pressure side pressure and outputs the low-pressure side MV.

The higher-order selector 26 receives inputs of the high-pressure side MV and the low-pressure side MV, selects a larger value of them as MV for controlling the turbine bypass valve 23 and sends steam of controlled amount from the high-pressure header 4 to the low-pressure header 6. According to such control, when steam pressure in the high-pressure header 4 becomes higher than a predetermined level, the steam pressure in the high-pressure header 4 can be decreased. Furthermore, when the steam pressure in the low-pressure header 6 becomes lower than a predetermined level, the steam pressure in the low-pressure header 6 can be increased.

The low-pressure header 6 is further connected to a low-pressure steam supply system not shown. The low-pressure steam supply system supplies low-pressure steam to the low-pressure header 6. The low-pressure steam supply system is controlled by a control device which previously stores low-pressure side flow control SV (Set Value) therein. When pressure in the low-pressure header 6 exceeds the low-pressure side flow control SV, the amount of steam supplied from the low-pressure steam supply system to the low-pressure header 6 is decreased.

Japanese Laid-Open Patent Application JP-A-Heisei, 11-257018 describes an invention concerning a steam turbine steam bypass device for smoothly releasing steam used on a turbine side to a high-pressure steam condenser when the steam turbine is shut down in an emergency due to breakdown (at trip).

Japanese Laid-Open Patent Application JP-A-Heisei, 7-229405 describes a turbine bypass control method in a combined plant including: a turbine bypass connected to an inlet of a steam turbine and having a turbine bypass valve; and a turbine governor for controlling the turbine bypass valve, wherein, when the turbine governor stops an automatic control of the turbine bypass valve, the turbine governor controls the turbine bypass valve using pressure higher than the steam pressure at this time by a predetermined value as a set pressure.

DISCLOSURE OF INVENTION

There are cases where the turbine 16 trips during operation of the steam system 2. In such case, the control part 24 receives an interlock signal generated at turbine trip, generates an emergency open signal, quickly opens the turbine bypass valve 23 to the full and sends steam of the high-pressure header 4 to the low-pressure header 6. According to this control, a sudden increase of pressure in the high-pressure header 4 and a sudden decrease of pressure in the low-pressure header 6 just after trip can be avoided.

FIG. 2 shows time variation of the steam pressure in the low-pressure header 6 after the turbine 16 is tripped at time t1 and the turbine bypass valve 23 is fully opened. After trip, when the steam pressure exceeds the low-pressure side flow control SV, the amount of steam supplied from a low-pressure steam supply system is controlled to be reduced. However, since the amount of steam flown from the turbine bypass line 22 is larger, the increase of the steam pressure continues.

When the steam pressure exceeds a blow-off valve control SV at time t2, the controller 32 starts to open the blow-off valve 30 and low-pressure steam is discharged to the outside of the system via the blow-off valve 30. However, due to delay in an operation of the blow-off valve 30 and delay in response of the controller 132, after time t2, the steam pressure in the low-pressure header 6 largely exceeds a set pressure. When the steam pressure exceeds the safety valve SV at time t3, steam is discharged via the safety valve 28 to decrease the steam pressure. To operate the steam system 2 stably and efficiently, such control of the steam pressure is required to be improved. Since less use of the safety valve 28 serves as an indication that the plant is stably operated, there is a demand for control in which the safety valve 28 is not used as much as possible.

An object of the present invention is to provide a control method and a control device of a steam system, which enable a stable operation at trip of a turbine.

A steam system control method according to the present invention is applied to a steam system including: a low-pressure header for storing low-pressure steam therein; a high-pressure header for storing high-pressure steam therein; a steam turbine connected between the low-pressure header and the high-pressure header; and a turbine bypass line for supplying controlled amount of steam in the high-pressure header to the low-pressure header by bypassing the steam turbine. The low-pressure header has a blow-off valve for discharging excessive steam to the outside.

According to the present invention, a steam system control method includes: a normal time blow-off valve control step of controlling an opening of the blow-off valve based on an MV value, wherein the MV value is generated based on a PV value obtained by measuring a pressure of steam in the low-pressure header and a set SV value; a step of generating a trip signal when a turbine is tripped; and a trip time blow-off valve control step of controlling the opening of the blow-off valve by changing the MV value to a determined trip time set value in response to the trip signal. According to this method, when the turbine is tripped and excessive steam flows into the bypass, the opening of the blow-off valve is controlled based on the defined MV value so that excessive steam flown into the low-pressure header is quickly discharged to the outside.

A steam system control method includes: a normal time blow-off valve control step of controlling an opening of the blow-off valve based on an MV value, wherein the MV value is generated based on a PV value obtained by measuring a pressure of steam in the low-pressure header and a set SV value; a step of generating a trip signal when a turbine is tripped; and a trip time blow-off valve control step of controlling the opening of the blow-off valve by changing the SV value to a determined trip time set value in response to the trip signal.

A steam system control method according to the present invention includes: a step of setting back the SV value to the SV value at the normal time blow-off valve control step at a set change rate after the trip time blow-off valve control step is continued for a predetermined period of time.

A steam system control method according to the present invention further includes: a step of changing the blow-off valve control step to the normal time blow-off valve control step after the blow-off valve control step is continued for a predetermined period of time.

A steam system control method according to the present invention further includes: a step of obtaining trip time steam flow indicating steam flow of the turbine before the turbine is tripped. The trip time set value is determined based on the trip time steam flow.

A steam system control method according to the present invention includes: a step of obtaining a trip time opening indicating an opening of a governor valve for controlling steam flow supplied from the high-pressure header to the turbine before the turbine is tripped. The trip time set value is determined based on the trip time opening.

A steam system control device according to the present invention includes respective parts required for automatically performing the steam system control method according to the present invention.

According to the present invention, the steam system control method and the control device which enable a stable operation when the turbine is tripped.

BEST MODE FOR CARRYING OUT THE INVENTION

Figure 1:
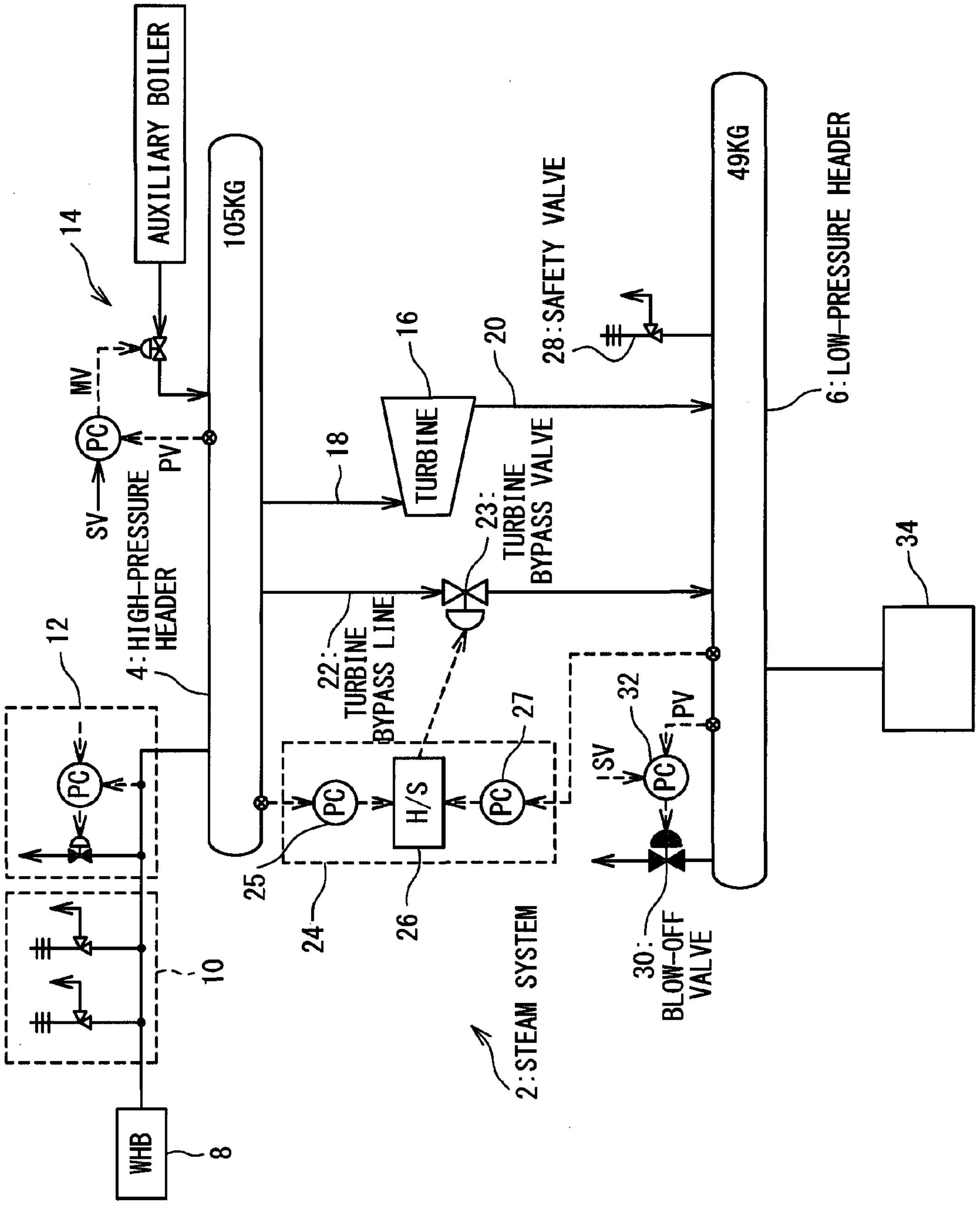
FIG. 1 shows a configuration of a steam system.
Figure 2:
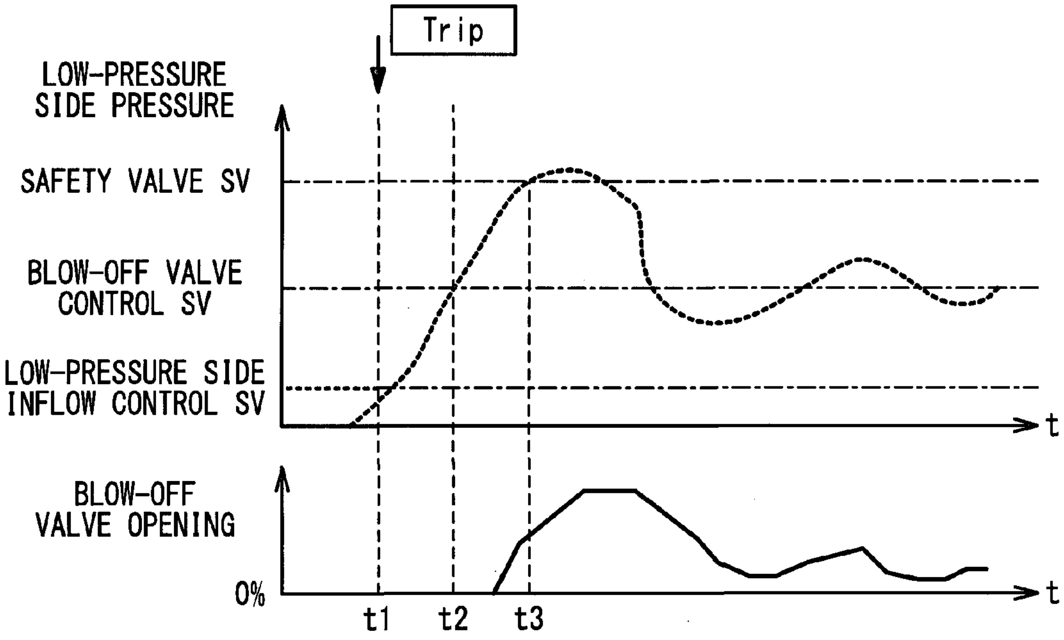
FIG. 2 shows variation in steam pressure in the low-pressure header in a case where the turbine is tripped.

Best modes for carrying out the present invention will be described below referring to the accompanying drawings. A control device and a control method in the present embodiment are realized by replacing a controller 132 with a below-mentioned controller 32 having additional functions at trip of a turbine in the steam system 2 which is shown in FIG. 1 and described as background art. Hereinafter, referring to FIG. 1, the added functions of the controller 32 will be described.

Figure 3:
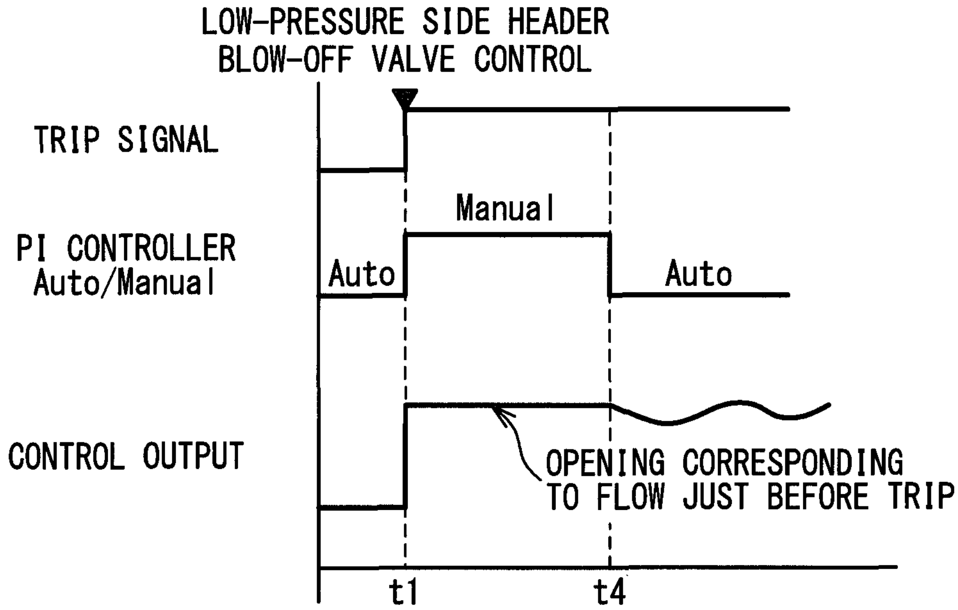
FIG. 3 is a timing chart schematically showing a steam system control method.

FIG. 3 is a timing chart schematically showing the steam system control method in the present embodiment. The controller 132 of the steam system 2 controls the blow-off valve 30 by the aforementioned PI controller in a normal operation. This control in normal time is referred to as an Auto control. When the turbine 16 is tripped at time t1, the mode of the PI controller of the controller 32 is changed from the auto control to a manual control and a normal PI (Proportional-Integral) control is stopped (MV tracking). However, the term "manual" does not necessarily mean a prompt operation waiting for an input operation by man. Rather, it means that a control based on predefined opening value, not normal control based on the SV value and the PV value, is performed.

In the manual mode, the controller 32 generates a trip time opening set value being opening corresponding to flow just before trip (opening corresponding to steam flow supplied from the turbine 16 to the low-pressure header 6 before trip) and outputs the trip time opening set value in place of the output of the MV value in the normal control. The blow-off valve 30 performs an operation in accordance with the trip time opening set value in place of the MV value in normal time. According to this control, the blow-off valve 30 is opened more quickly than in normal time and it is possible to discharge the steam quickly from the turbine bypass 22 to the low-pressure header 6 at trip of the turbine to the outside. As a result, an increase in the steam pressure in the low-pressure header 6 can be suppressed. By performing tracking at the opening of the blow-off valve 30 which corresponds to turbine flow just before trip, the opening of the blow-off valve 30 at trip can be easily set.

After the manual control is performed for a defined time, an off-delay timer stops the manual control at time t4 and the controller 32 is switched to the auto control. After time t4, the blow-off valve 30 is PI-controlled by the controller 32 again.

Figure 4:
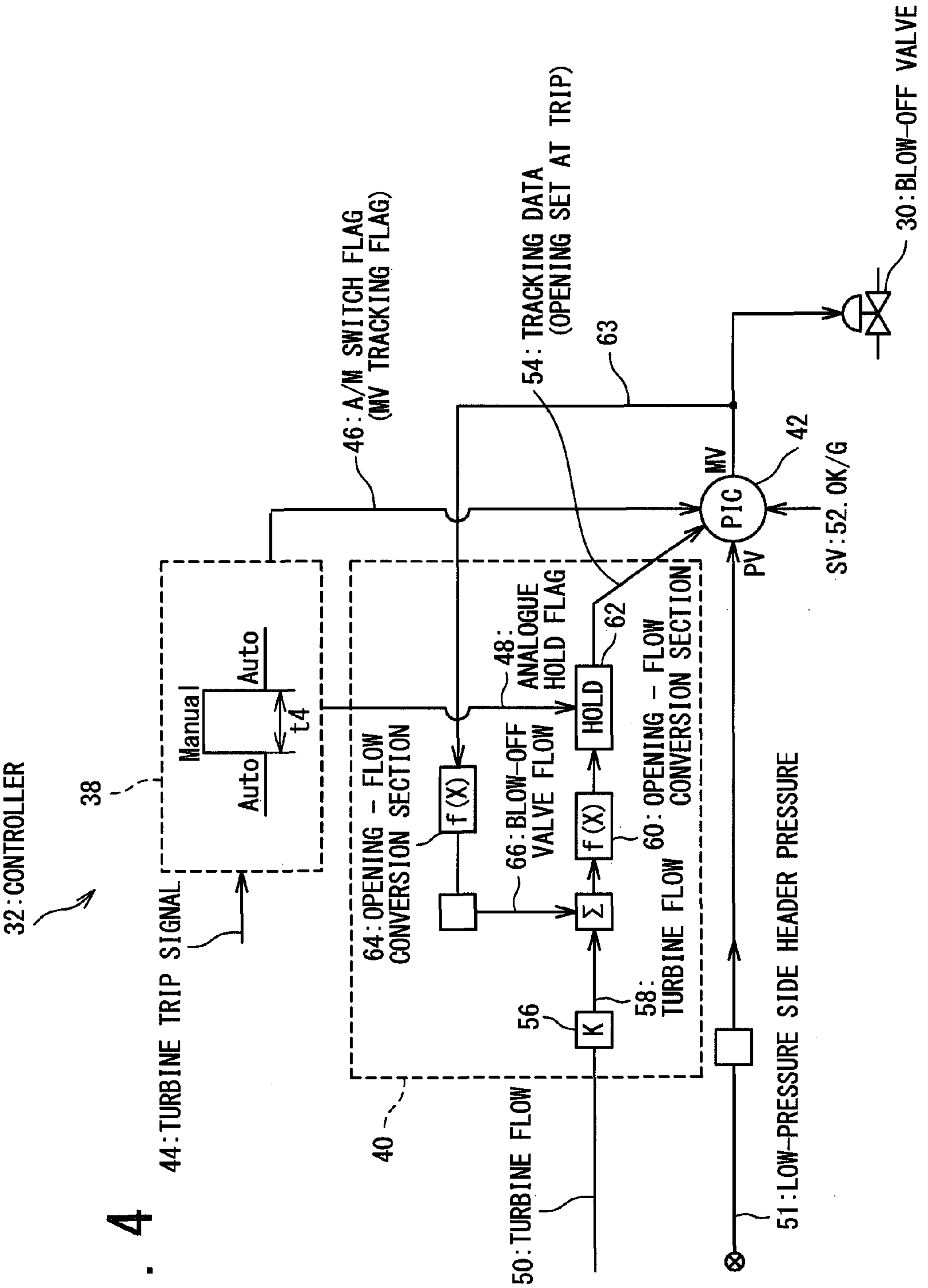
FIG. 4 shows the structure of a controller of the blow-off valve.

FIG. 4 shows a configuration of the controller 32 for performing such control method. The controller 32 has an off-delay timer (trip signal obtaining section) 38, a trip time blow-off valve control section 40 and a PI controller 42.

The off-delay timer 38 obtains a trip signal issued when the turbine 16 is tripped from a turbine trip signal generator not shown. When the turbine trip signal is obtained, the off-delay timer 38 sets a binary A/M switch flag 46 representing either one of the two values of an auto operation mode and a manual operation mode to the manual operation mode and outputs it to the PI controller 42. Furthermore, when the trip signal is obtained, the off-delay timer 38 sends an analog hold flag 48 being a flag instructing to start tracking of the MV value at trip to an analog hold 62 being a circuit in the trip time blow-off valve control section 40.

The trip time blow-off valve control section 40 has a low-pressure header flow conversion section 56, a flow-opening conversion section 60, the analog hold 62 and an opening-flow conversion section 64. When receiving a turbine trip signal 44 from the turbine trip signal generator, the low-pressure header flow conversion section 56 obtains a turbine flow 50 just before trip of the turbine. The turbine flow 50 is a measurement value of steam flow in the turbine inlet piping 18. The low-pressure header flow conversion section 56 applies predetermined calculation to the turbine flow 50, generates a turbine flow 58 representing an increase of the steam flow supplied to the low-pressure header 6 due to trip of the turbine (for example, a flow just before trip of a condenser connected to a subsequent stage of the turbine 16 is an increase in the amount of steam fallen from the turbine bypass line 22 into the low-pressure header 6 at trip of the turbine) and outputs the turbine flow 58 to the flow-opening conversion section 60. The predetermined calculation is achieved by, for example, multiplying the turbine flow 50 by a pre-stored coefficient K.

The opening-flow conversion section 64 obtains the MV value of the PI controller 42 just before trip of the turbine. The opening-flow conversion section 64 converts the MV value being an opening instruction value of the blow-off valve 30 into a blow-off valve flow 66 indicating flow of the steam flowing through the blow-off valve 30 on a basis of a pre-stored formula and outputs the blow-off valve flow 66 to the flow-opening conversion section.

The flow-opening conversion section 60 generates a flow target value of the blow-off valve 30 at trip by adding the turbine flow 58 to the blow-off valve flow 66. The flow-opening conversion section 60 converts the flow target value into the trip time opening set value being an opening instruction value on the basis of a pre-stored formula and outputs the converted value to the analog hold 62. The analog hold 62 holds the trip time opening set value 54 in a storage device when the analog hold flag 48 is received and sends the value to the PI controller 42.

When receiving the A/M switch flag 46 indicating a manual operation mode, the PI controller 42 stops the PI control in normal time and switches the PI control to the manual operation mode. The PI controller 42 in the manual operation mode outputs the trip time opening set value 54 received from the analog hold 62 as the MV value for the blow-off valve 30. In response to the MV value, the blow-off valve 30 is controlled to be opened.

By setting the trip time opening set value 54 based on the turbine flow 58 just before trip, the blow-off valve 30 is opened in accordance with a flow of the steam which does not flow into the turbine 16 at trip but excessively flows into the low-pressure header 6 through the turbine bypass line 22. As a result, variation in pressure in the low-pressure header 6 is suppressed. Since the trip time opening set value 54 is set based on an MV value 63 just before trip, in a case where the blow-off valve 30 has already operated at a certain opening at trip, the opening is added to the trip time opening set value 54, and the opening of the blow-off valve 30 is controlled in accordance with the flow of the excessive steam. After an elapse of a predetermined period of time since the A/M switch flag representing the manual control occurs, the off-delay timer 38 generates the A/M switch flag representing the auto control and sends the A/M switch flag to the PI controller 42. The PI controller 42 receiving the A/M switch flag returns to the PI control in normal time.

In the example shown in FIG. 4, the steam flow of the turbine inlet piping 18 just before trip multiplied by a predetermined value is used as the amount of steam excessively flown into the low-pressure header 6. In place of this flow, other values may be adopted. For example, the blow-off valve can be controlled by obtaining opening of a governor valve not shown for controlling the steam flow of the turbine inlet piping 18 just before trip and calculating the amount of steam excessively fallen from the opening into the low-pressure header 6 at trip using a predetermined formula.

Figure 5:
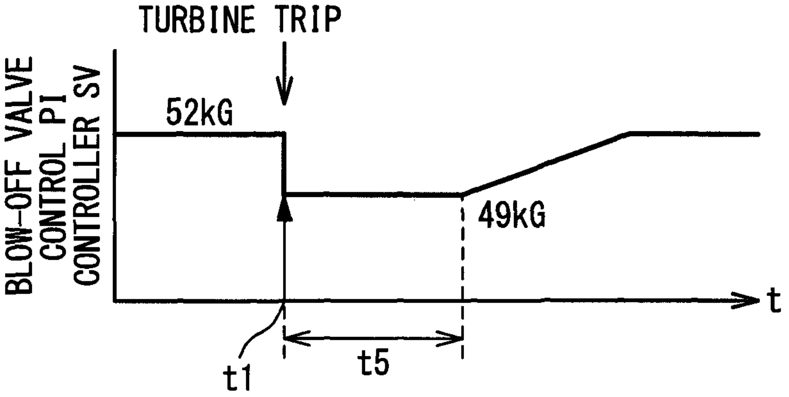
FIG. 5 is a timing chart showing control to change the SV value.

FIG. 5 shows a control in a modification example of the above-mentioned embodiment. The operation of the off-delay timer 38 is the same as in the above-mentioned embodiment. The PI controller 42 set to the manual operation mode switches the SV value in the normal PI control (ex.: 52 kG) to a smaller SV value (ex.: 49 kG) to perform the PI control. After this control is performed for a predetermined period of time (t5), the SV value is set back to the SV value in normal time by a change rate limiter at a change rate set to be smaller than a predetermined value. By temporarily decreasing the SV value, the blow-off valve 30 is quickly opened and an increase in pressure in the low-pressure header 6 is suppressed. Since the setting value is increased by the change rate limiter when the SV value is set back to the SV value in normal time, disturbance due to variation of the setting value is small.

The invention claimed is:

1. A steam system control method comprising:

controlling an opening of a blow-off valve which controls an amount of steam discharged from a low-pressure header storing low-pressure steam based on a manipulated value (MV) value, wherein the MV value is generated based on a process value (PV) value obtained by measuring a pressure of steam in the low-pressure header and a set value (SV) value;

generating a trip signal when a turbine is tripped, wherein the turbine is driven by high-pressure steam supplied from a high-pressure header storing the high-pressure steam and steam discharged from the turbine is supplied to the low-pressure header; and controlling the opening of the blow-off valve by changing the MV value or the SV value to a determined trip time set value in response to the trip signal.

2. The steam system control method according to claim 1, further comprising:

setting back the SV value to the SV value at the controlling in which the MV value is generated based on the PV value and the set SV value at a set change rate after the controlling in response to the trip signal is continued for a predetermined period of time.

3. The steam system control method according to claim 1, further comprising:

changing the controlling in response to the trip signal to the controlling in which the MV value is generated based on the PV value and the set SV value after the controlling in response to the trip signal is continued for a predetermined period of time.

4. The steam system control method according to claim 1, further comprising:

obtaining trip time steam flow indicating flow of the turbine before the turbine is tripped, wherein the trip time set value is determined based on the trip time steam flow.

5. The steam system control method according to claim 1, further comprising:

obtaining a trip time opening indicating an opening of a governor valve for controlling steam flow supplied from the high-pressure header to the turbine before the turbine is tripped, wherein the trip time set value is determined based on the trip time opening.

6. A steam system control apparatus comprising:

a controller configured to control an opening of a blow-off valve which controls an amount of steam discharged from a low-pressure header storing low-pressure steam based on a manipulated value (MV) value, wherein the MV value is generated based on a process value (PV) value obtained by measuring a pressure of steam in the low-pressure header and a set value (SV) value;

a trip signal obtaining section configured to obtain a trip signal when a turbine is tripped, wherein the turbine is driven by high-pressure steam supplied from a high-pressure header storing the high-pressure steam and steam discharged from the turbine is supplied to the low-pressure header; and a trip time blow-off valve control section configured to control the opening of the blow-off valve by changing the MV value or the SV value to a determined trip time set value in response to the trip signal.

7. The steam system control apparatus according to claim 6, wherein the trip time blow-off valve control section sets back the SV value to the set SV value of the controller at a set change rate after control by the trip time blow-off valve control section is continued for a predetermined period of time.

8. The steam system control apparatus according to claim 6, wherein the blow-off valve control by the blow-off valve control section is changed to the blow-off valve control by the normal time blow-off valve control section after a predetermined period of time from when the trip signal obtaining section obtains the trip signal.

9. The steam system control apparatus according to claim 6, further comprising:

a trip time steam amount obtaining section configured to obtain trip time turbine flow indicating steam flow of the turbine just before the turbine trips, wherein the trip time set value is determined based on the trip time steam flow.

10. The steam system control apparatus according to claim 6, further comprising:

a trip time opening obtaining section configured to obtain a trip time opening indicating an opening of a governor valve for controlling steam flow supplied from the high-pressure header to the turbine before the turbine is tripped, wherein the trip time set value is determined based on the trip time opening.

* * * * *